US009582434B2

(12) United States Patent
Lindsay

(10) Patent No.: US 9,582,434 B2
(45) Date of Patent: *Feb. 28, 2017

(54) ENHANCED SECURITY FOR ACCESSING VIRTUAL MEMORY

(71) Applicant: Intel Corporation, Santa Clara, CA (US)

(72) Inventor: Ronnie Lindsay, Chandler, AZ (US)

(73) Assignee: Intel Corporation, Santa Clara, CA (US)

( * ) Notice: Subject to any disclaimer, the term of this patent is extended or adjusted under 35 U.S.C. 154(b) by 47 days.

This patent is subject to a terminal disclaimer.

(21) Appl. No.: 14/564,413

(22) Filed: Dec. 9, 2014

(65) Prior Publication Data

US 2015/0096050 A1 Apr. 2, 2015

Related U.S. Application Data

(63) Continuation of application No. 13/732,236, filed on Dec. 31, 2012, now Pat. No. 8,935,800.

(51) Int. Cl.
G06F 17/30 (2006.01)
G06F 12/14 (2006.01)
G06F 21/60 (2013.01)
G06F 21/79 (2013.01)

(52) U.S. Cl.
CPC ............ *G06F 12/145* (2013.01); *G06F 21/60* (2013.01); *G06F 21/79* (2013.01); *G06F 2212/1052* (2013.01); *G06F 2212/50* (2013.01)

(58) Field of Classification Search
CPC .......... G06F 21/78; G06F 21/79; G06F 21/80; G06F 21/86; G06F 3/062; G06F 3/0622; G06F 3/0623; G06F 3/0637
USPC ...... 726/26–30; 713/168, 192–194; 711/1–4, 711/100–105, 111
See application file for complete search history.

(56) References Cited

U.S. PATENT DOCUMENTS

| 5,539,898 | A | 7/1996 | Trevett et al. |
| 5,627,987 | A | 5/1997 | Nozue et al. |
| 6,148,377 | A | 11/2000 | Carter et al. |
| 6,430,667 | B1 | 8/2002 | Loen |
| 6,549,959 | B1 | 4/2003 | Yates et al. |
| 6,823,433 | B1 | 11/2004 | Barnes et al. |
| 6,854,039 | B1 | 2/2005 | Strongin et al. |
| 7,020,772 | B2 | 3/2006 | England et al. |
| 7,120,771 | B2 | 10/2006 | Dahan et al. |
| 7,237,081 | B2 | 6/2007 | Dahan et al. |
| 7,278,008 | B1 * | 10/2007 | Case ................... G06F 12/1036 710/26 |
| 7,426,644 | B1 | 9/2008 | Strongin et al. |
| 7,434,002 | B1 * | 10/2008 | Zedlewski .......... G06F 11/3409 711/130 |
| 7,890,753 | B2 | 2/2011 | Dahan et al. |

(Continued)

Primary Examiner — Hosuk Song
(74) Attorney, Agent, or Firm — Trop, Pruner & Hu, P.C.

(57) ABSTRACT

A disclosed method includes obtaining a physical address corresponding to a virtual address responsive to detecting a virtual address associated with a memory access instruction and, responsive to identifying a memory page associated with the physical address as a sensitive memory page, evaluating sensitive access information associated with the memory page. If the sensitive access information satisfies a sensitive access criteria, invoking a sensitive access handler to control execution of the memory access instruction.

20 Claims, 5 Drawing Sheets

(56) References Cited

U.S. PATENT DOCUMENTS

| | | | |
|---|---|---|---|
| 7,971,027 B2 * | 6/2011 | Fleming | G06F 12/126 |
| | | | 711/203 |
| 8,051,301 B2 | 11/2011 | Barnes et al. | |
| 8,055,876 B2 * | 11/2011 | Fleming | G06F 12/0223 |
| | | | 711/203 |
| 8,645,631 B2 * | 2/2014 | Hooker | G06F 12/0862 |
| | | | 711/122 |
| 8,935,800 B2 * | 1/2015 | Lindsay | G06F 21/60 |
| | | | 726/26 |
| 8,990,505 B1 * | 3/2015 | Jamil | G06F 12/0864 |
| | | | 711/128 |
| 2003/0093686 A1 | 5/2003 | Barnes et al. | |
| 2003/0140205 A1 | 7/2003 | Dahan et al. | |
| 2003/0140244 A1 | 7/2003 | Dahan et al. | |
| 2003/0140245 A1 | 7/2003 | Dahan et al. | |
| 2004/0123118 A1 | 6/2004 | Dahan et al. | |
| 2004/0243783 A1 | 12/2004 | Ding et al. | |
| 2006/0036830 A1 | 2/2006 | Dinechin et al. | |
| 2007/0294496 A1 | 12/2007 | Goss et al. | |
| 2008/0183931 A1 | 7/2008 | Verm et al. | |
| 2009/0024891 A1 | 1/2009 | Choudhury et al. | |
| 2010/0211827 A1 | 8/2010 | Moyer et al. | |
| 2010/0211828 A1 | 8/2010 | Moyer et al. | |
| 2010/0250895 A1 | 9/2010 | Adams et al. | |
| 2012/0059973 A1 | 3/2012 | Adams et al. | |
| 2012/0278588 A1 | 11/2012 | Adams et al. | |

* cited by examiner

ENHANCED SECURITY FOR ACCESSING VIRTUAL MEMORY

This application is a continuation of U.S. patent application Ser. No. 13/732,236, filed Dec. 31, 2012, the content of which is hereby incorporated by reference.

FIELD

The present disclosure relates to the field of information processing and, more particularly, to the field of memory access management.

BACKGROUND

General purposes microprocessors typically include or support various security and protection mechanisms. Virtual memory support, for example, enables multitask execution environments by maintaining distinct physical memory locations for different applications so that application programmers can define and refer to a location in memory without fear that a different application will have access to that same memory location. Microprocessors may also support the use of protection rings to implement various degrees of access restriction security for core operating system routines. If, however, a rogue application defeats the hierarchical protection mechanism implemented by the operating system, a reliable secondary mechanism to provide supplemental security would be beneficial.

DESCRIPTION

Figure 1:
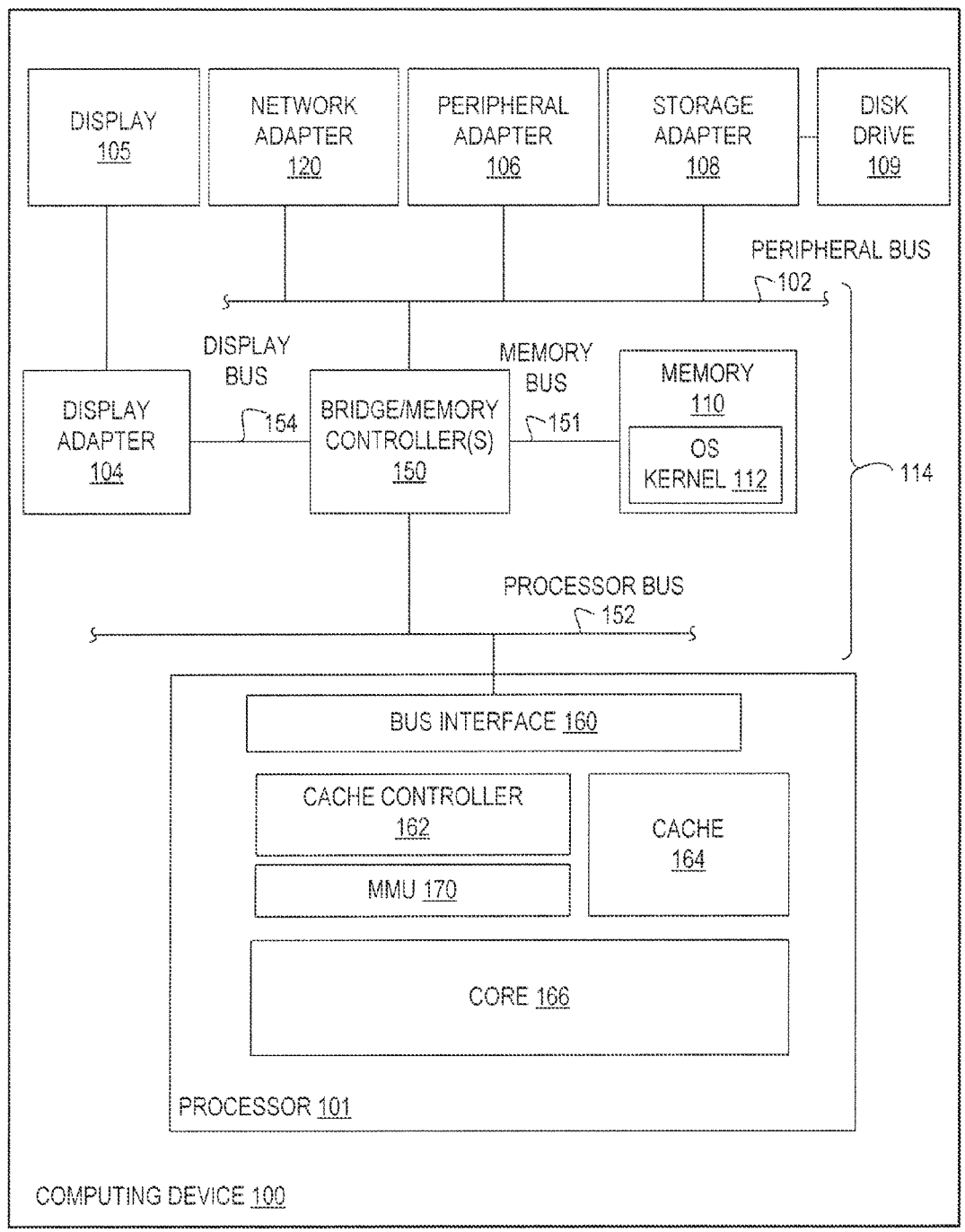
FIG. 1 illustrates a multiprocessor system used in conjunction with at least one embodiment.

At least one embodiment of a disclosed system includes a processor having support for virtual addressing and including a memory management unit (MMU) to receive a virtual address and provide a corresponding physical address. At least one embodiment of the MMU may access a buffer storing entries representing virtual address-to-physical address translations, wherein an entry in the buffer includes a sensitive access information and generate, based on the sensitive access information, a sensitive access interrupt or fault. Embodiments of the sensitive access information may include a sensitive access enable bit and a sensitive access recency bit, and at least one embodiment of the MMU may generate the sensitive access interrupt when the sensitive access enable bit and the sensitive access recency bit are both asserted. Embodiments may further include a timing mechanism and a reset mechanism to clear the sensitive access recency bit and then, after a specified delay period, reset the sensitive access recency bit. In at least one embodiment, the sensitive access interrupt signal is a checkpoint fault that indicates, to an operating system, which processes were executed after a previous checkpoint. Embodiments of the MMU may include an input to receive a virtual address associated with a memory access instruction and an output to provide a physical address corresponding to the virtual address.

In at least one embodiment, a disclosed method for implementing sensitive access oversight during execution of program instructions includes detecting a virtual address associated with a memory access instruction and obtaining a corresponding physical address. Embodiments of the method may determine whether a memory page associated with the physical address is a sensitive memory page and, if so, evaluate sensitive access information associated with the page. In some embodiments, if the sensitive access information satisfy a sensitive access criteria, a sensitive access handler may be invoked to control execution of the memory access instruction. Invoking such a handler to control execution of a memory access instruction as described herein may be referred to as invoking a "chaperoned" execution of the memory access instruction. Embodiments of the sensitive handler may take an action including, as examples, verifying an execution environment, validating an integrity of the memory page, and giving the kernel an opportunity to deny the access for any policy defined reason.

In at least one embodiment, whether a memory page is a sensitive memory page may be indicated by a sensitive access enable bit associated with the memory page. In some embodiments, the sensitive access information may include additional parameters including, for example, a recency parameter indicating how recently the memory page was accessed. In some embodiments, recency information may be used to permit un-chaperoned execution of a second and subsequent access to a memory page occurring soon after a first instruction accessing the page was chaperoned. In this manner, chaperoned execution may be implemented without substantially impacting performance when a process makes numerous accesses to a sensitive page over a short period of time. In some embodiments, recency may be measured in terms of clock cycles or some other proxy for chronological time. If multiple sensitive pages are being accessed concurrently, distinct recency measures may be maintained for each sensitive page. Alternatively, some embodiments may maintain a single counter for all sensitive pages on a most conservative basis, e.g., recency is determined based on the least recently accessed of all the sensitive pages.

In addition to memory management and lookaside buffer hardware to implement sensitive access monitoring as described herein, at least one embodiment of disclosed subject matter herein includes policies for identifying sensitive pages and how to process them. For example, embodiments may implement policies for setting a sensitive access enable bit to identify sensitive pages. In some embodiments, the sensitive access enable bit may be set based on a characteristic of the type of information stored on the memory page. In some embodiments, characteristics of information stored on a memory page that might trigger sensitive access handling may include characteristics indicating that a memory pages is storing or requesting personally identifying information, personal financial information, network configuration information, execution context information, and protection level information.

In at least one embodiment, a processor includes a TLB to generate a physical address corresponding to a virtual address contained in a memory access instruction, e.g., a memory access instruction currently being fetched, decoded, or executed. In some embodiments, the processor may further include a MMU to invoke a sensitive access handler to control execution of the memory access instruction when the memory access instruction access a physical addressing corresponding to a memory page that satisfies sensitive access criteria. In some embodiments, the processor may further include a page table or an analogous data structure stored in a computer readable storage medium accessible to the processor.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12. In addition, all references to asserting a signal are polarity agnostic unless expressly stated otherwise. Thus, in the context of a digital or binary signal, a description of a signal as being asserted encompasses signals that are asserted low as well as signals that are asserted high.

Referring now to the drawings, FIG. 1 depicts selected elements of one embodiment of a multiprocessor system 100. The FIG. 1 multiprocessor system 100 includes multiple processors 101, a system memory 120, and a memory controller 142 that permits processors 101 to read and write to system memory 120. In the FIG. 1 multiprocessor system 100, memory controller 142 is implemented in a microprocessor support device referred to herein as the near hub 140. Near hub 140 shares access to a system bus 115 with processors 101. In other embodiments, processors 101-1 and 101-2 may communicate with each other, whether directly or through an intermediary, via point-to-point interfaces, rather than via a shared bus 115.

The FIG. 1 multiprocessor system 100 may include peripheral devices and other resources that provide various functions. Generally, a function connected via a bus interface to a bus may be referred to herein as an "agent" of that bus. For example, with reference to system bus 115, processors 101, near hub 140, and shared cache 150, are agents of system bus 115. Although system bus 115 and some other busses referred to herein are described as being shared busses, at least some shared busses may be implemented as point-to-point (PtP) interconnects or PtP busses.

As depicted in FIG. 1, near hub 140 includes, in addition to memory controller 142, a bus bridge 145 that provisions a graphics bus 147 to which a graphics controller 146 is connected. Graphics bus 147 may be implemented as a dedicated or non-shared bus that operates in compliance with a standard such as the Peripheral Component Interconnect Express (PCIe) or a legacy graphics bus such as Accelerated Graphics Port (AGP). Near hub 140 as shown further includes a far hub bus interface 148 that facilitates communication between near hub 140 and an I/O hub referred to herein as far hub 160 via interconnect 149.

Far hub 160 may integrate adapters, controllers, and ports for various interconnection protocols to support different types of I/O devices. The depicted implementation of far hub 160 includes, as an example, an expansion bus controller 161 that supports an expansion bus 165 that complies with PCI or another suitable bus protocol. Examples of functions that may be provided via expansion bus 165 include a network adapter 162, an audio controller 167, and a communications adapter 169. Network adapter 162 may enable communication with an IEEE 802.11 family or other type of wireless data network, a Gigabit Ethernet or other type of wireline data network, or both. Audio adapter 167 may include or support high definition audio codecs. Communications adapter 169 may include or support modems and/or transceivers to provide wireless or wireline telephony capability. Far hub 160 may further include a high bandwidth serial bus controller 170 that provides one or more ports 172 of a Universal Serial Bus (USB) or other suitable high bandwidth serial bus 175.

The FIG. 1 far hub 160 further includes a storage adapter 180 that supports a persistent storage interconnect 185 such as an Integrated Drive Electronics (IDE) interconnect, a Serial ATA interconnect, or a SCSI interconnect to a storage drive 181 that controls persistent storage 182. Far hub 160 may further include a Low Pin Count (LPC) controller 190 that provides an LPC bus 195 to connect low bandwidth I/O devices including, as examples, a keyboard, a mouse, a parallel printer port, and an RS232 serial. Multiprocessor system 100 as depicted in FIG. 1 employs a Super I/O device 192 to interface any or all of these I/O devices 194 with LPC controller 190.

The FIG. 1 multiprocessor system 100 includes two processors 101-1 and 101-2, but the number of processors may differ in other implementations. Each of the FIG. 1 processors 101 includes an execution core 110, a local cache memory 111, and a bus interface 114 that facilitates data exchange with system bus 115. Execution cores 110 include registers and functional units for fetching, decoding, and executing instructions and for writing results back to the registers. The set of instructions that execution cores 110 support, sometimes referred to herein simply as the instruction set, may include arithmetic instructions, floating point instructions, conditional and unconditional branch-type instructions, and memory access instructions.

Local cache memory 111 may include one or multiple distinct caches memories arranged hierarchically. Each distinct local cache memory may be segregated into a data cache and an instruction cache. In an example implementation, local cache memory 111 may include an L1 instruction cache, an L1 data cache, and an L2 cache containing both instructions or data. Each processor 101 may include a local cache controller (not depicted) that implements a cache coherency policy for local cache 111. An example cache coherency policy that local cache 111 may support is a MESI protocol that defines four states a cache line may assume, namely, modified, exclusive, shared, and invalid. Processor 101 may, however, include or support cache coherency states that are different than or in addition to these four states. For example, local cache 111 may support a forwarded state (F) indicating which of multiple processors that share a cache line is responsible for providing the line to a requesting agent.

The FIG. 1 multiprocessor system 100 includes a shared cache 150 connected to system bus 115 via a bus interface 154. External cache 150 may provide shared cache storage to each processor 101 of multiprocessor system 100. A controller of external cache 150 may implement a cache coherency policy that is the same as or differs from the cache coherency policy maintained in local cache 111. In addition, multiprocessor system 100 may implement an inclusion policy in which shared cache 150 is inclusive of, exclusive of, or not inclusive of local cache 111. For purposes of this disclosure, an exclusive policy refers to an inclusion policy that prohibits a line in shared cache 150 from being also resident in the local cache 111, an inclusive policy requires that all lines in local cache 111 reside in shared cache 150 as well, and a nonexclusive policy refers to any policy that does not satisfy either of the other criteria, e.g., most, but not necessarily all, lines in local cache 111 reside in shared cache 150.

Microprocessor 101 may include a MMU that implements at least a portion of memory management methods described herein. MMUs described herein may identify sensitive pages and chaperone, control, or otherwise influence the execution context of an instruction that accesses a page of memory flagged as a sensitive memory page. A sensitive memory page could be a page of memory that includes information that is confidential, personal, private, or otherwise possesses characteristics that might warrant caution in permitting an application to access, execute, or otherwise expose the page. The criteria used to identify pages as being sensitive may encompass substantially any policy that a developer wishes to implement. The operating system may permit applications programmers to identify sensitive page locally. Procedures performed prior to accessing context sensitive memory pages may vary depending upon the implementation, but could include, as examples, anything from a relaxed security policy to a human-presence hardened fingerprint/face analyzing code integrity validation scheme.

Figure 2:
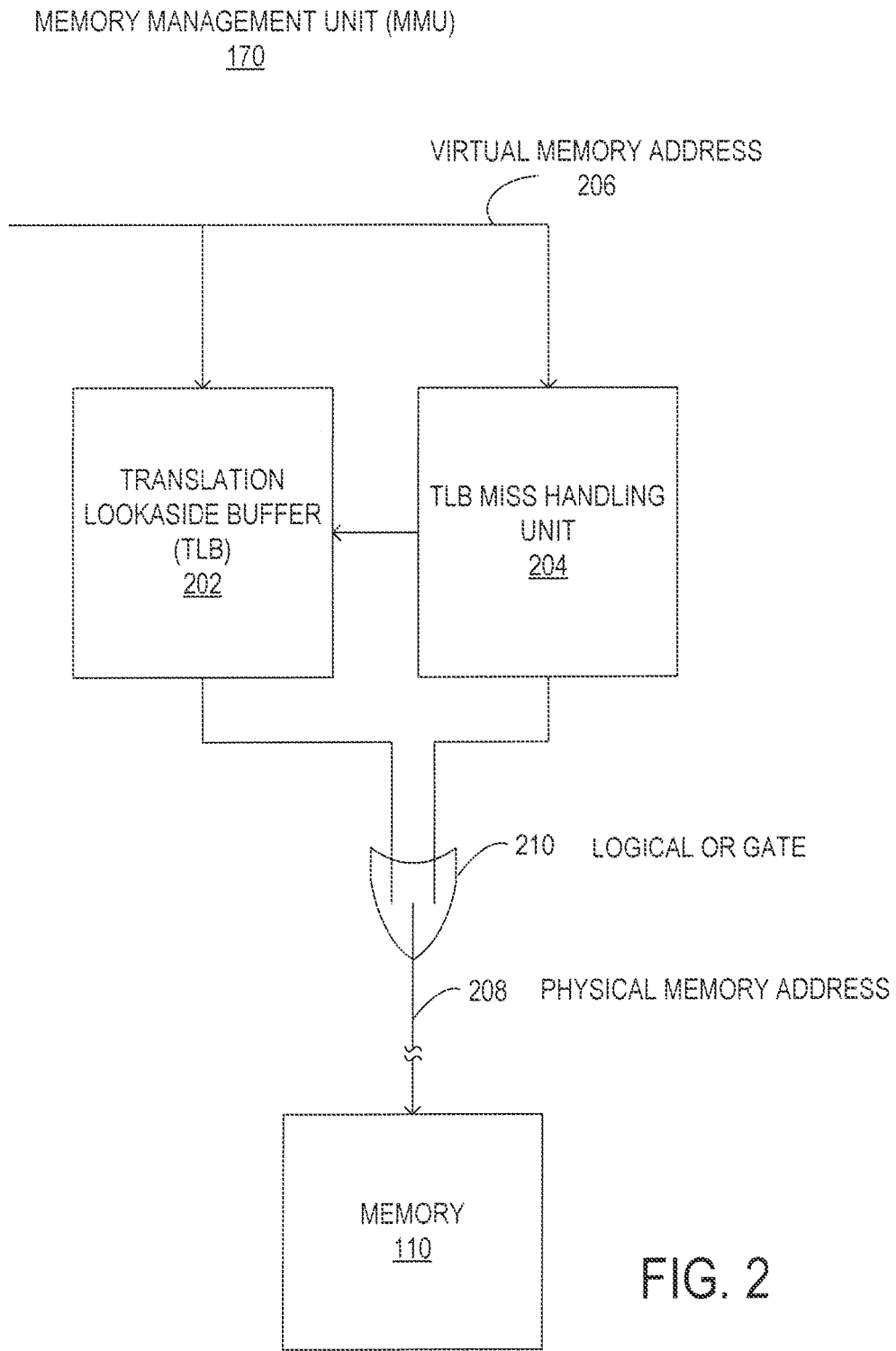
FIG. 2 illustrates a memory management unit used in conjunction with at least one embodiment.

Turning now to FIG. 2, a block diagram of selected elements of an embodiment of MMU 170 is illustrated. The FIG. 2 MMU 170 includes a TLB to translate virtual addresses that are received from an execution unit of the FIG. 1 microprocessor 101 to physical addresses that are provided to a tag array of a cache memory. As depicted in FIG. 2, TLB (TLB) 202 receives a virtual address 206 and provides a corresponding physical address (PA) 208 to a cache tag array 250. Cache tag array 250 may be associated with an L1 data cache (not depicted) of the FIG. 1 processor 101. It is noted that MMU 170 may include additional functionality or complexity not explicitly depicted in FIG. 2. For example, in certain embodiments (not shown), TLB (TLB) 202 may be a multi-level buffer.

The FIG. 2 embodiment of TLB 202 includes a TLB hit/miss signal 204 that TLB 202 asserts when virtual address 206 "hits" in TLB 202, i.e., TLB hit/miss signal 204 indicates whether VA 206 matches any entry in TLB 202. The depicted embodiment of TLB 202 also includes a status signal 207 that TLB maintains to indicate status of the memory page corresponding to virtual address 206. Status signal 207 may include multiple bits to indicate, as examples, whether a memory page is a read only page and whether the memory page is reserved for instructions or data, and so forth. Status signal 207 may indicate additional information indicative of a characteristic of the applicable memory page. Thus, for example, status signal 207 may include one or more bits indicating a protection level associated with a memory page, an identity of a processor, core, or thread associated with the memory access instruction, or some other suitable characteristic.

The FIG. 2 MMU 170 includes logic 210, which receives hit/miss signal 204 and status signal 207 and generates a gate signal 211 as its output. When hit/miss signal 204 and status signal 207 indicate that the memory access instruction that generated VA 206 is a valid type of access to a valid page of memory that hits in TLB 202, logic 210 may assert gate signal 211. In the FIG. 2 embodiment, gate signal 211 provides a control input to a latch 216 that receives physical address 208 generated by TLB 202. In this embodiment, latch 216 gates PA 208 to cache tag array 250 in response to logic 210 asserting gate signal 211 to indicate that the memory access instruction is a permitted type of access to a valid page of memory that corresponds to a valid entry in TLB 202.

The FIG. 2 embodiment of TLB miss handler 230 receives virtual address 206 and TLB hit/miss signal 204 and communicates with page table 240 over a page table connection 232. When TLB his/miss signal 207 indicates that VA 206 misses in TLB 202, miss handler 230 may perform a "table walk" of VA 206 through page table 240 to obtain a physical address. TLB miss handler 230 may also initiate a page event in which a page of physical memory is retrieved from the disk storage and stored in physical memory 120 and page table 240 is updated to reflect the new page in memory. TLB miss handler 230 may then provide the physical address to TLB 202 to update TLB 202. Updating TLB 202 may involve a determination of an entry to evict or invalidate an existing entry.

In conjunction with enabling and supporting chaperoned execution of sensitive memory access transactions, the FIG. 2 embodiment of TLB 202 sends a sensitive access signal 209 to sensitive access logic 218. In some embodiments, the state of sensitive access signal 209 corresponds to a state of sensitive access information each entry of TLB 202. The FIG. 2 embodiment of sensitive access logic 218 receives the same gate signal 211 that latch 216 receives. In this context gate signal 211 may be thought of as indicating "procedurally" valid memory access and sensitive access signal 209 indicates whether the access is sensitive substantively. When gate signal 211 and sensitive access signal 209 are both asserted, sensitive access logic 218 may assert a chaperoned execution signal 220. Chaperoned execution signal 220 may be analogous to an interrupt and may, when asserted, invoke a chaperoned execution handler to control the execution of memory access instruction.

Figure 3:
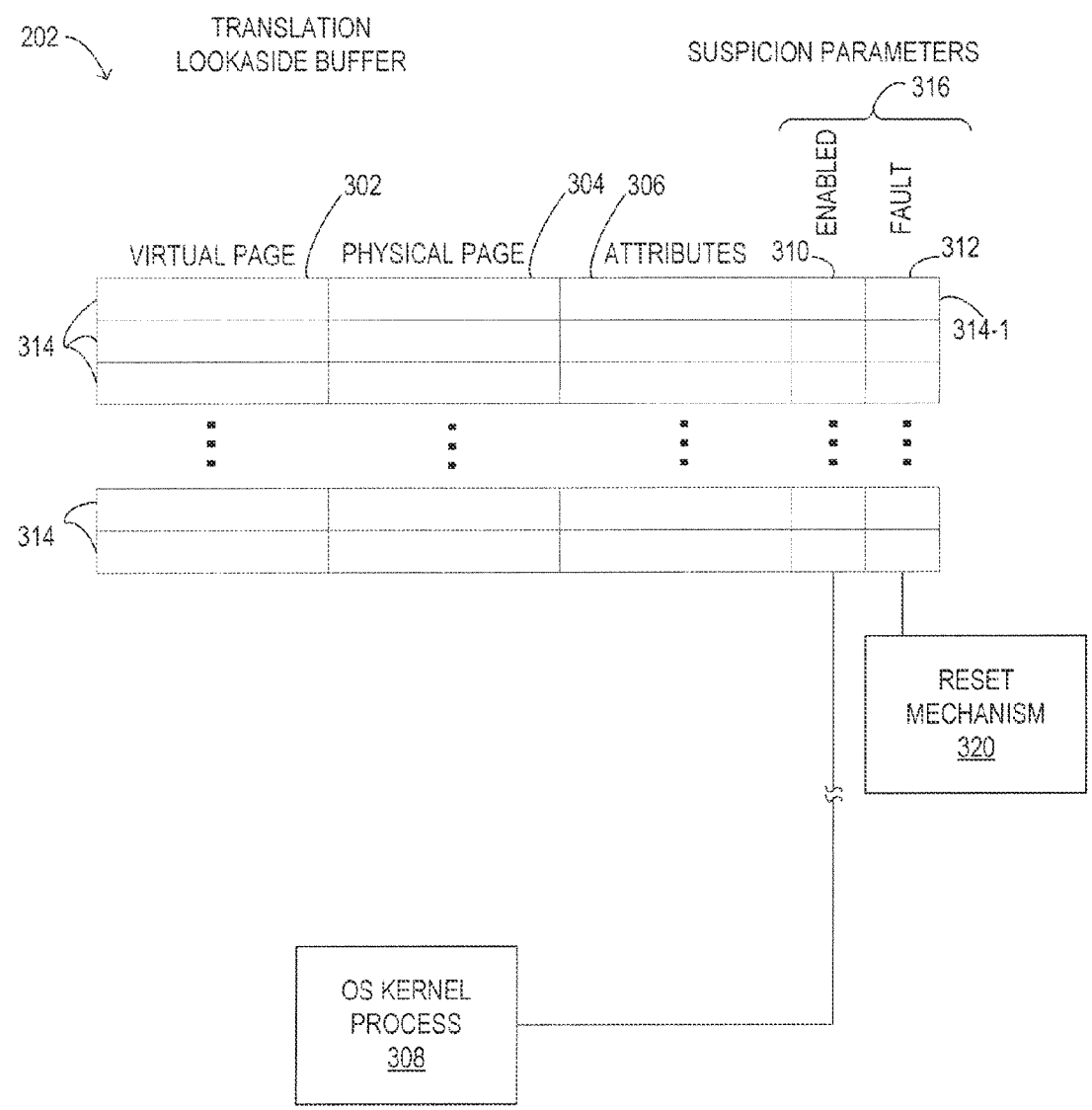
FIG. 3 illustrates a translation lookaside buffer used in conjunction with at least one embodiment.

Turning now to FIG. 3, selected elements of an embodiment of a TLB 202 are depicted. The FIG. 3 embodiment of sensitive access information 316 includes information pertaining the page of memory itself as well as information indicating how recently the applicable page of memory was accessed. The depicted embodiment of TLB 202 includes a table 301 of entries 314. Each entry 314 in table 301 may correspond to a page of memory and includes a virtual address field 302, a physical address field 304, a page attributes field 306, and additional information referred to in FIG. 3 as sensitive access information 316.

Page attributes field 306 may include one or more bits describing various attributes of the applicable page of memory. Page attributes field 306 may include, as examples, a valid bit indicating whether the page is valid, a resident or present bit indicating whether the page is resident in system memory, a read/write bit indicating whether the page may be written to, a used bit indicating whether the page has been accessed recently, a modified bit indicating whether the page has been written to, a protection level field including one or more bits indicating whether there are protection level restrictions on the page, and a processor identification field including one or more bits identifying a process with which the page is associated.

Sensitive access information 316 may be used, at least in part, to determine whether execution of a memory access should be chaperoned. In the depicted embodiment, sensitive access information 316 includes an enable bit 310 and a recency bit 312. An asserted enable bit 310 may indicate that the applicable page of memory has been identified as a page of memory potentially requiring chaperoned execution. The assertion of enable bit 310 may be controlled by a sensitive access policy 308.

Sensitive access policy 308 may include rules or operating system instructions for determining pages of memory that represent chaperoned execution candidates. Sensitive access policy 308 may, as an example, identify a page of memory that includes information broadly characterized as privacy information. Depending upon the embodiment, privacy information might include personally identifying information (PII), e.g., personal contact information including name, address, telephone number, email address, social security number, driver's license number, and so forth. Privacy information might further include a category of information identified herein as personal financial information. Personal financial information might include, as examples, financial account numbers including account numbers for credit cards, checking and savings account, and investment accounts as well as balance and transaction information pertaining to those accounts, and any passwords or user IDs associated with those accounts. Sensitive access policy 308 might further include rules for identifying pages of memory that include information broadly characterized as security information. Security information may include, as examples, any information pertaining to the configuration of any network the user is connected to including any local area networks, public or private intranets, virtual private networks, and so forth. An example of network configuration might include information identifying the port numbers that are currently in use. Security information might also include information pertaining to the execution context of a thread or process that a user is executing. Execution context information might include, as an example, information pertaining to the instruction pointer or a context stack employed by an end user system. Similarly, execution context information might include any information pertaining to protection levels, supervisory modes, and the like.

Sensitive access policy 308 may also permit direct control of sensitive enable bits 310. For example, application programmers and/or system administrators may be permitted to set and clear sensitive access the sensitive access enable directly via a system call or a supported instruction.

Employing sensitive access information 316 enables the use of a last line of defense security to flag pending execution or access of codes or data that have been determined according to sensitive access criteria embodied in sensitive access policy 308. As described above, sensitive access policy 308 may employ or encompass any of a wide variety of criteria, filters, rules, or considerations for determining which portions of code or data might be subject to a sensitive access screening. However, in recognition of the performance limiting nature of performing additional security verifications or clearances, the FIG. 3 embodiment of sensitive access information 316 while identifying sensitive code or data through the use of enable bit 310, further includes recency bit 312 to limit excessive repeated invocations of chaperoned execution when, for example, a thread or processor makes multiple access to the same page of memory close in time to each other. Therefore, as suggested by its name, recency bit 312 may reflect a timing parameter.

The embodiment of TLB 202 depicted in FIG. 3 may, therefore, set any of the sensitive access indicator enable bits 310 for any entry 314 in translation look aside buffer 202. When a memory access to a virtual address corresponding to an entry 314 in which the sensitive access indicator enable bit 310 is asserted, the FIG. 3 embodiment will either chaperone the execution of the memory access instruction or permit the instruction to execute unattended depending on the state of the recency bit 312. If the page of memory the memory access instruction is attempting to access was accessed in a recently executed instruction that invoked chaperoned execution handling, recency bit 312 may be in the un-asserted state and chaperoned execution may be bypassed. If, however, the amount of time elapsed since the chaperoned execution occurred exceeds a threshold value, recency bit 312 may be in the asserted state and sensitive access handling may be invoked.

Thus, the described embodiment responds to the simultaneous assertion of enable bit 310 and recency bit 312 by triggering a process that chaperones, supervises, oversees, or otherwise controls the execution of the memory access instruction. Moreover, just as the sensitive access policy 308 described above for identifying a sensitive access may encompass numerous implementations employing a number of different considerations, the chaperoned execution referred to herein also encompasses a number of implementations and considerations.

Because the FIG. 3 embodiment of recency bit 312 indicates information pertaining to time, a timing resource may be required to control the value of the recency bits 312. The number of timing resources employed to maintain the values of the various recency bits 312 is an implementation detail. Implementing, at one extreme, a dedicated recency timer for each entry 314 in table 301 may be impracticable and provide only marginally improved performance over other implementations. The FIG. 3 embodiment of recency bits 312 employs a single timing mechanism, referred to as the reset mechanism 324, to control the values of all sensitive access indicators 312. Still other embodiments, not depicted, may employ a relatively small number of timing mechanisms to provide individual control over the different sensitive pages. The depicted reset mechanism 324 may measure time using a proxy such as the number of clock cycles.

In some embodiments, recency bit 312 may cleared immediately following the chaperoned execution of an instruction referencing the applicable page of memory. In conjunction with reset mechanism 324 of FIG. 3, recency bit 312 may be reset after a predefined period of time, e.g., 10 ms, or a proxy for the predefined period of time, e.g., 100 clock cycles. In this manner, the disclosed implementation of accessing memory and implementing sensitive access handling, permits un-chaperoned access to an otherwise sensitive memory page for a brief interval following the chaperoned execution of the applicable memory page. By enabling close-in-time accesses to a sensitive memory page to proceed without chaperoned execution beneficially improves the performance of the MMU without substantially increasing the risk of permitting a rogue access to execute undetected.

Figure 4:
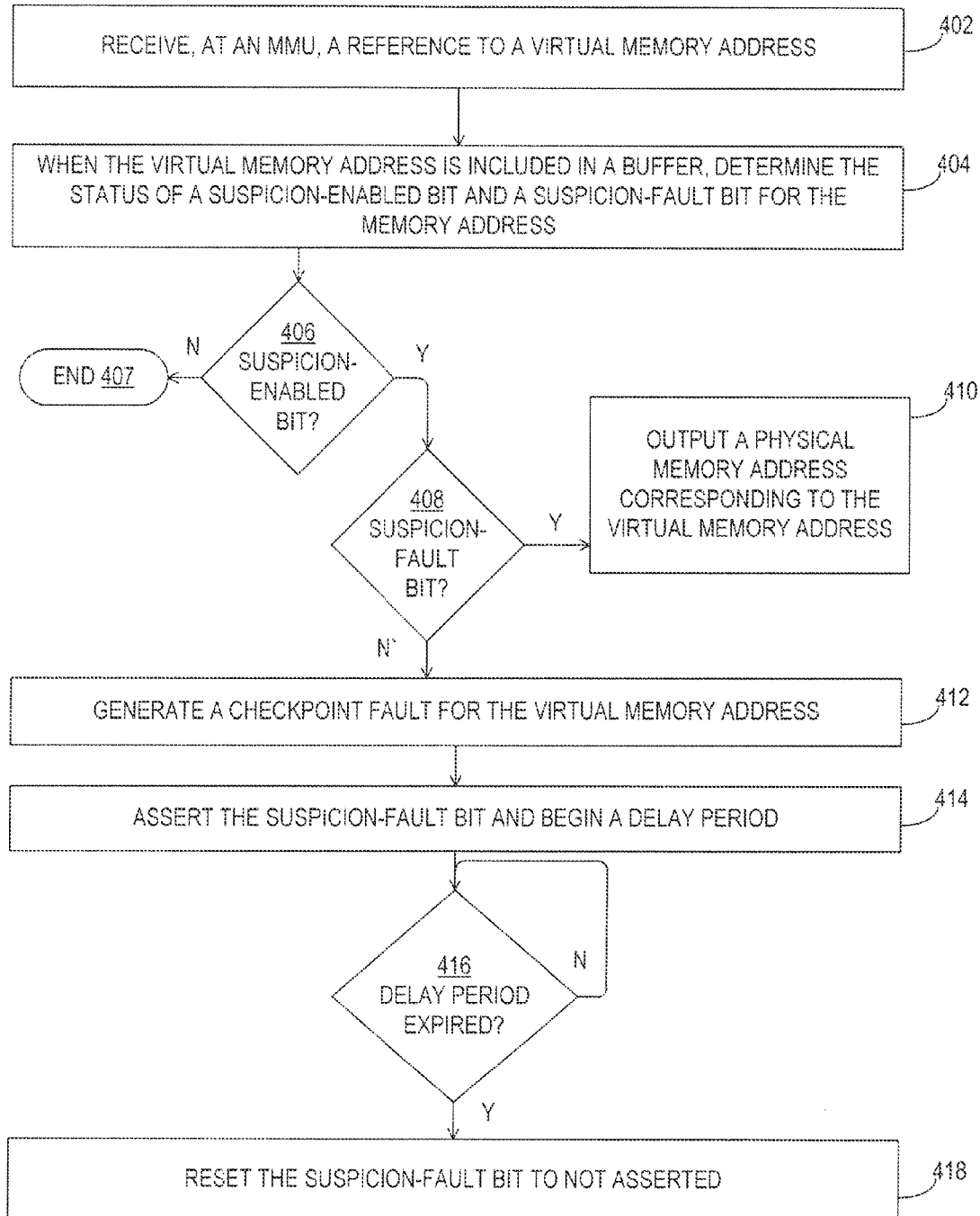
FIG. 4 illustrates one embodiment of a method for incorporating a contextually-based security check in a memory management unit.

Turning now to FIG. 4, one embodiment of a method 400 for implementing a memory management based context sensitive execution via memory management and memory access techniques is disclosed. In the embodiment depicted in FIG. 4, method 100 includes receiving (operation 402) a virtual address and obtaining (operation 404) a physical address associated with the virtual address. Obtaining a physical address associated with a virtual address may include indexing a TLB with the virtual address to generate the corresponding physical address when the virtual address hits in the TLB. If the virtual address misses in the TLB, obtaining the physical address associated with the virtual address may include invoking TLB miss handler 230 (FIG. 2) to "walk" the page table 240.

The depicted embodiment of method 400 further includes determining (operation 406) a sensitive access status of a page of memory associated with the virtual address. As described previously, determining the sensitive access status of a memory page may include determining the values of one or more sensitive access bits stored in an applicable entry of a page table or TLB. The sensitive access bits may include and enable bit identifying memory pages that are defined as or subject to context sensitive handling. The enable bit may be set by a sensitive access policy (308, FIG. 3) as described previously. In addition to the enable bit, sensitive access information 316 may include a recency bit 312 (FIG. 3) that may be used in conjunction with enable bit 310 to control execution of the memory access instruction.

The FIG. 4 embodiment of method 400 determines (operation 408) whether a memory page associated with the physical address determined in operation 406 is a candidate for sensitive access handling. If the memory page associated with the physical address is not a sensitive access candidate, method 400 permits (operation 410) un-chaperoned access to the memory page associated with the physical address and proceeds to operation 430 to increment a clock cycle counter.

If method 400 determines at operation 408 that the address reference in a memory access instruction identifies a page of memory that is a sensitive access candidate, e.g., by determining that its enable bit 310 is asserted as described above, method 400 determines (operation 420) whether there has been a recent access to the same page of system memory. Whether a recent access has occurred may encompass whether the clock cycle counter value exceeds a predetermined threshold. As described previously, the determination of whether a recent access has occurred may be determined by the state of recency bit 312 as depicted in FIG. 3. If, in operation 420, method 400 concludes that there has been no recent access, the FIG. 4 embodiment of method 400 includes raising (operation 422) a chaperoned execution signal to invoke a chaperoned execution handler to control execution of the memory access instruction. Once the chaperoned execution signal is raised in operation 422, method 400 may include invoking (operation 424) a chaperoned execution handler to execute the instruction. In these embodiments, the chaperoned execution signal raised in (operation 422) may be analogous to a conventional interrupt signal and invoking chaperoned execution may include providing the chaperoned execution signal to a programmable interrupt controller to invoke the corresponding chaperoned execution handler.

The chaperoned execution handler may evaluate execution environment characteristics to decide whether to permit the underlying memory access instruction to access to the applicable page of memory. Execution environment characteristics that the handler may evaluate include, as some examples, characteristics indicating the application program that initiated the memory access instruction, characteristics indicative of an identity of a user device that initiated the access to the memory page, and characteristics indicative of a network and protocol associated with the user device. The sensitive access handler may include a user verification module to verify the identity of the user. The user verification model might include question and answer verification, biometric authentication, or any of other various verification models. When chaperoned execution is initiated in operation 424, the FIG. 4 embodiment of method 400 clears (operation 426) the recency bit to indicate that chaperoned execution for this page of memory has occurred recently and, therefore, need not re-occur until the recency bit changes state.

Method 400 as shown in FIG. 4 further includes, after performing either operation 426 or 410, incrementing (operation 430) the clock cycle counter and determining (operation 432) whether the clock cycle counter exceeds a predetermined threshold or limit. If the clock cycle counter exceeds the threshold, the recency bit of the applicable page is set. For embodiments in which there are fewer clock cycle counters than recency bits to count, the setting of recency bit in operation 434 may include setting the recency bit for all pages to which the counter applies.

Figure 5:
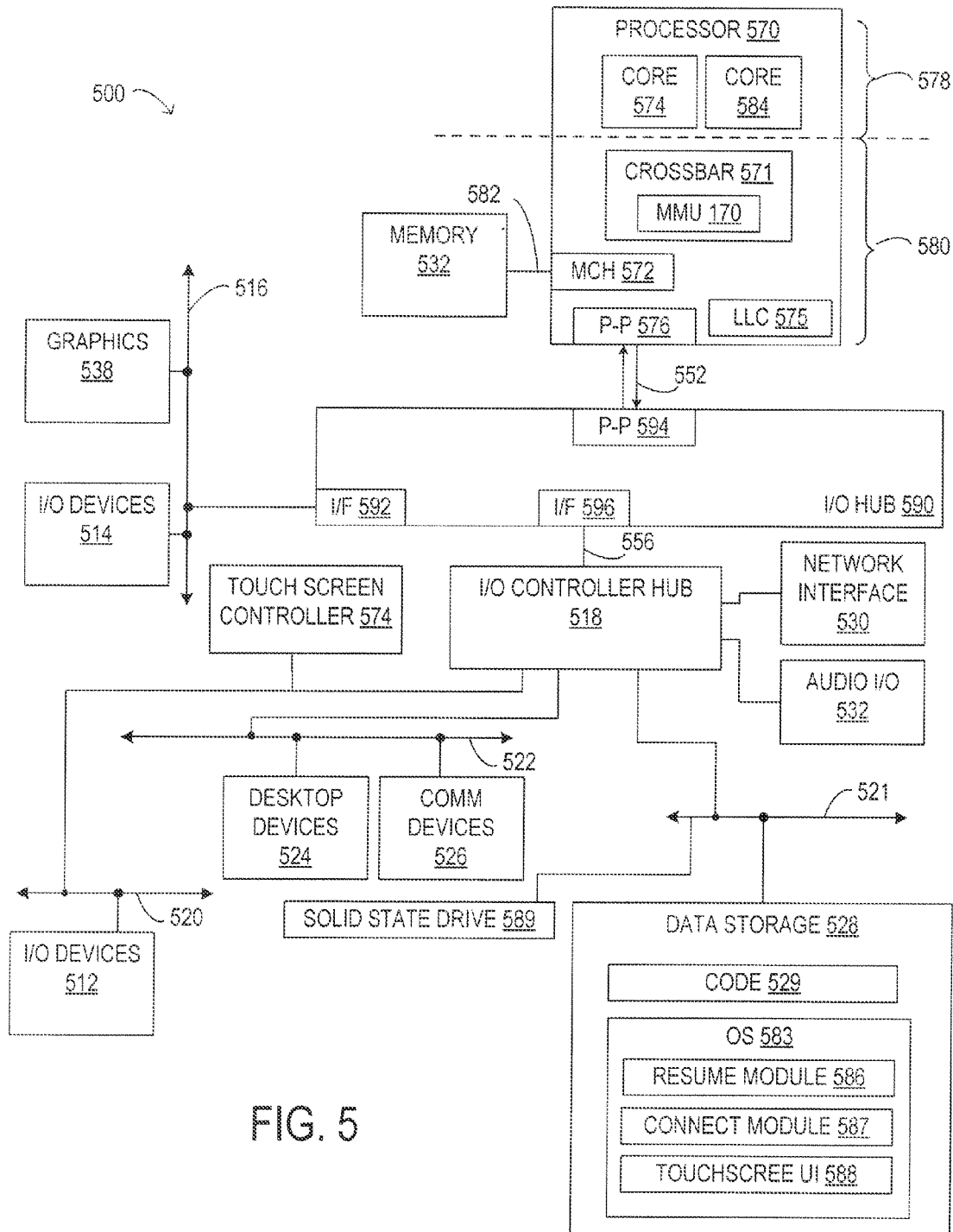
FIG. 5 illustrates a microprocessor system used in conjunction with at least one embodiment.

Referring now to FIG. 5, selected elements of a multicore processor system 500 that provides and supports sensitive access monitoring and chaperoned execution as described herein are depicted. The FIG. 5 embodiment of system 500 includes a point-to-point interconnect system and a multi-core processor 570 that includes a multi-core processor including a first core 574-1 and a second core 574-2. As shown, a portion of processor 570 including first core 574-1 and second core 574-2 may be referred to as core portion 578. An uncore portion 580 of processor 570 including elements of processor 570 excluding cores 574. In different embodiments (not shown in FIG. 5), a varying number of cores may be present in a particular processor. Cores 574 may comprise a number of sub-elements (not shown in FIG. 5), also referred to as clusters, that provide different elements of overall functionality. For example, cores 574-1 and 574-2 may each include a memory cluster (not shown in FIG. 5) that may comprise one or more levels of cache memory. Other clusters (not shown in FIG. 5) in cores 574, 584 may include a front-end cluster and an execution cluster.

In the FIG. 5 embodiment, first core 574-1 and second core 584-2 communicate with each other via crossbar 571, which may include intelligent functionality such as cache control, data queuing, P-P protocols, and multi-core interfacing. Crossbar 571 may thus represent an intelligent uncore controller for uncore portion 580 interconnects the processor's cores 574 with memory controller hub (MCH) 572, last-level cache memory (LLC) 575, and P-P interface 576, among other elements. In particular, to improve performance in such an architecture, cache controller functionality within crossbar 571 may enable selective caching of data within a cache hierarchy including LLC 575 and/or one or more caches present in cores 574. As shown in FIG. 5, crossbar 571 includes an MMU 170, which as described previously, handles virtual addresses and maintains at least one TLB (not shown in FIG. 5) for improved performance with regard to memory access.

In FIG. 5, LLC 575 may be coupled to a pair of processor cores 574, 584, respectively. For example, LLC 575 may be shared by core 574 and core 584. LLC 575 may be fully shared such that any single one of cores 574, 584 may fill or access the full storage capacity of LLC 575. Additionally, MCH 572 may provide for direct access by processor 570 to memory 532 via memory interface 582. For example, memory 532 may be a double-data rate (DDR) type dynamic random-access memory (DRAM) while memory interface 582 and MCH 572 comply with a DDR interface specification. Memory 532 may represent a bank of memory interfaces (or slots) that may be populated with corresponding memory circuits for a desired DRAM capacity.

Processor 570 may also communicate with other elements of processor system 500, such as I/O hub 590 and I/O controller hub 518, which are also collectively referred to as a chipset that supports processor 570. P-P interface 576 may be used by processor 570 to communicate with I/O hub 590 via interconnect link 552. In certain embodiments, P-P interfaces 576, 594 and interconnect link 552 are implemented using Intel QuickPath Interconnect architecture.

As shown in FIG. 5, crossbar 590 includes interface 592 to couple crossbar 590 with first bus 516, which may support high-performance I/O with corresponding bus devices, such as graphics 538 and/or other bus devices, represented by I/O devices 514. Graphics 538 may represent a high-performance graphics engine that outputs to a display device (not shown in FIG. 5). In one embodiment, first bus 516 is a Peripheral Component Interconnect (PCI) bus, such as a PCI Express (PCIe) bus and/or another computer expansion bus. I/O hub 590 may also be coupled to I/O controller hub 518 at interface 596 via interconnect link 556. In certain embodiments, interface 596 is referred to as a south bridge. I/O controller hub 518 may provide I/O interconnections for various computer system peripheral devices and interfaces and may provide backward compatibility with legacy computer system peripheral devices and interfaces. Thus, I/O controller hub 518 is shown providing network interface 530 and audio I/O 532, as well as, providing interfaces to second bus 520, third bus 522, and fourth bus 521, as will be described in further detail.

Second bus 520 may support expanded functionality for microprocessor system 500 with I/O devices 512, and may be a PCI-type computer bus. Third bus 522 may be a peripheral bus for end-user consumer devices, represented by desktop devices 524 and communication devices 526, which may include various types of keyboards, computer mice, communication devices, data storage devices, bus expansion devices, etc. In certain embodiments, third bus 522 represents a Universal Serial Bus (USB) or similar peripheral interconnect bus. Third bus 521 may represent a computer interface bus for connecting mass storage devices, such as hard disk drives, optical drives, disk arrays, which are generically represented by data storage 528, shown including code 530 that may be executable by processor 570.

The FIG. 5 embodiment of system 500 includes an operating system 583 that may be entirely or partially stored in a data storage 528. Operating system 583 may include various modules, application programming interfaces, and the like that expose to varying degrees various hardware and software features of system 500. The FIG. 5 embodiment of system 500 includes, for example, a resume module 586, a connect module 587, and a touchscreen user interface 588. System 500 as depicted in FIG. 1 may further include various hardware/firm features include a capacitive or resistive touch screen controller 574 and a second source of persistent storage such as a solid state drive 589.

The resume module 586 may be implemented as software that, when executed, performs operations for reducing latency when transition system 500 from a power conservation state to an operating state. Resume module 586 may work in conjunction with the solid state drive (SSD) 589 to reduce the amount of SSD storage required when system 500 enters a power conservation mode. Resume module 586 may, for example, flush standby and temporary memory pages before transitioning to a sleep mode. By reducing the amount of system memory space that system 500 is required to preserve upon entering a low power state, resume module 586 beneficially reduces the amount of time required to perform the transition from the low power state to an operating state. The connect module 587 may include software instructions that, when executed, perform complementary functions for conserving power while reducing the amount of latency or delay associated with traditional "wake up" sequences. For example, connect module 587 may periodically update certain "dynamic" applications including, as examples, email and social network applications, so that, when system 500 wakes from a low power mode, the applications that are often most likely to require refreshing are up to date. The touchscreen user interface 588 supports a touchscreen controller 574 that enables user input via touchscreens traditionally reserved for handheld applications. In the FIG. 1 embodiment, the inclusion of touchscreen support in conjunction with support for desktop devices 524 enable system 500 to provide features traditionally found in dedicated tablet devices as well as features found in dedicated laptop and desktop type systems.

Embodiments may be implemented in code and may be stored on a storage medium having stored thereon instructions which can be used to program a system to perform the instructions. The storage medium may include, but is not limited to, any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

To the maximum extent allowed by law, the scope of the present disclosure is to be determined by the broadest permissible interpretation of the following claims and their equivalents, and shall not be restricted or limited to the specific embodiments described in the foregoing detailed description.

What is claimed is:

1. A processor comprising:
a core to execute instructions; and
a memory management unit coupled to the core to cause a handler to control execution of a memory access instruction responsive to determination that a physical address corresponding to a virtual address in the memory access instruction is associated with a memory page having a first indicator to indicate that the memory page includes particular information and a second indicator to indicate that a recency of a most recent access of the memory page exceeds a threshold recency.

2. The processor of claim 1, wherein the first indicator is to be asserted under control of an access policy stored in storage.

3. The processor of claim 1, further comprising a translation lookaside buffer having a plurality of entries each to store address translation information and access control information.

4. The processor of claim 3, wherein the access control information includes the first indicator and the second indicator.

5. The processor of claim 1, wherein the handler is to verify an execution environment before the memory access instruction is permitted to access the memory page.

6. The processor of claim 1, wherein the handler is to validate an integrity of the memory page before the memory access instruction is permitted to access the memory page.

7. The processor of claim 1, wherein the memory management unit is to permit a subsequent memory access instruction to access the memory page without the handler if the subsequent memory access instruction is received within the threshold recency of the memory access instruction.

8. The processor of claim 1, wherein the particular information comprises sensitive information, wherein the sensitive information comprises one or more of privacy information and security information.

9. The processor of claim 1, wherein the core is to set the first indicator responsive to a first instruction.

10. A system comprising:
a processor including a memory management unit to invoke a handler to control execution of a memory access instruction responsive to determination that a physical address associated with the memory access instruction is associated with a memory page having a first indicator to indicate that the memory page includes particular information and a second indicator to indicate that a recency of a most recent access of the memory page exceeds a threshold recency;
a touchscreen controller to communicate with a touchscreen display; and
a memory coupled to the processor.

11. The system of claim 10, wherein the handler is to evaluate execution environment characteristics to determine whether to permit access to the memory page.

12. The system of claim 11, wherein the execution environment characteristics include characteristics indicative of one or more of an application program that initiated the access to the memory page, an identity of a user device that initiated the access to the memory page, and a network and protocol associated with the user device.

13. A non-transitory machine-readable medium having stored thereon instructions, which cause at least one machine to perform a method comprising:
obtaining a physical address corresponding to a virtual address associated with a memory access instruction;
determining a state of an enable indicator associated with the memory page; and
if the enable indicator is of a first state, determining if a second indicator associated with the memory page is of a second state, and if not, invoking a handler to control execution of the memory access instruction, including evaluating execution environment characteristics to determine whether to allow the memory access instruction to access the memory page.

14. The non-transitory machine-readable medium of claim 13, wherein the method further comprises executing the memory access instruction without involving the handler if a most recent access of the memory page occurred less recently than a threshold recency.

15. The non-transitory machine-readable medium of claim 13, wherein the method further comprises setting the second indicator associated with the memory page to the second state to indicate a recency of a most recent access to the memory page relative to a specified grace period.

16. The non-transitory machine-readable medium of claim 15, wherein the method further comprises setting the second indicator to the first state after the specified grace period.

17. The non-transitory machine-readable medium of claim 16, wherein the method further comprises setting the second indicator associated with the memory page to the second state responsive to execution of the handler.

18. The non-transitory machine-readable medium of claim 13, wherein the method further comprises setting the enable indicator to the first state based on an information characteristic of the memory page, wherein the information characteristic is indicative of a characteristic of information stored on the memory page.

19. The non-transitory machine-readable medium of claim 18, wherein the information characteristic indicates that information stored on the memory page includes one or more of personally identifying information, personal financial information, and protection level information.

20. The non-transitory machine-readable medium of claim 18, wherein the information characteristic indicates that information stored on the memory page is to access one or more of network configuration information and execution context information.

* * * * *